Patented Feb. 7, 1939

2,146,655

UNITED STATES PATENT OFFICE 2,146,655

PRODUCTS OBTAINED FROM THE HYDROGENATION OF LIGNIN IN THE PRESENCE OF SUITABLE CATALYSTS

Earl C. Sherrard and Elwin E. Harris, Madison, Wis., assignors to Henry A. Wallace as Secretary of Agriculture of the United States of America (his successors in office)

No Drawing. Application May 10, 1938, Serial No. 207,175

8 Claims. (Cl. 260—617)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to the total product or products obtained from the hydrogenation of lignin in the presence of suitable catalysts such as copper chromium oxide, nickel, platinum, etc., at high pressures under controlled temperatures. The product consists of a mixture of methanol and high-boiling hydrogenated products, the hydrogenated products varying according to the conditions imposed or the catalyst used. This product may be fractionated into components ranging from methyl alcohol to a high-melting product having possibilities as a plastic.

The principal object of our invention is the conversion of lignin waste into useful products. Lignin waste is available from various pulping processes, such as the sulphite, sulphate, soda and nitric acid processes, and may be converted, after suitable pretreatment, into new and useful products by hydrogenation. Lignin is available in the residue remaining after the removal of cellulose from wood or plant material by means of dilute acid at elevated pressures and temperatures as, for example, in the process of converting wood and plant products into sugars or alcohol, or after treatment with concentrated acid at lower temperatures and pressures.

Lignin obtained from wood or other lignin-containing materials by organic solvents—such alcohols as methyl, ethyl, butyl alcohols, and compounds with alcoholic groups such as ethylene glycol and the ethers of ethylene glycol, such as dioxan—containing small amounts of acid or base or organic acids or bases, is also suitable for production of these products.

Other objects will appear from the following description of the embodiments of the invention.

In the manufacture of pulp from wood, or other lignin-containing material, the lignin is converted into a soluble product. The amount of lignin waste from these processes is approximately one-fourth of the dry weight of the starting material. The lignin may be removed from solution by precipitation by various well-known methods as an insoluble salt. This insoluble material, after purification, is suitable for the preparation of this hydrogenated material.

Other pulping processes are now in the process of development involving the use of an organic solvent for lignin. In this process the ligno-cellulose complex is broken either by the acid present in the material to be pulped, by acidic substances formed during the pulping reaction, or by acidic or basic substances which may be added. The lignin isolated in this manner is water insoluble and may be separated from carbohydrates by concentrating the solution and pouring the concentrated solution into water. This lignin, when washed with water and dried, is then ready for hydrogenation.

Our product may be prepared from lignin from wood or lignin-containing plants. The lignin to be hydrogenated may be obtained as a by-product of the well-known soda, sulphate, or sulphite pulping processes, by removal from wood or ligneous plants with organic solvents containing acids or bases, by use of acidic or basic organic solvents, or by use of the sulphuric or fuming hydrochloric acid methods from wood or ligneous fibers.

Our process consists of the purification of lignin from any source by the removal of sugars, inorganic material, and impurities by selectively dissolving either the lignin or the impurities. The lignin is then dissolved or suspended in a solvent stable at high temperatures and in the presence of hydrogen such as 1-4 dioxan, monomethyl ether of ethylene, glycol, other glycol ethers, methanol, or p-propylcyclohexanol and placed in a high-pressure bomb, tested to 10,000 pounds pressure, with 5 to 50 grams of catalyst such as copper chromium oxide for each 100 grams of lignin. Hydrogen under 500 to 5000 pounds per square inch pressure is introduced. The bomb is shaken and heated at 100° to 350° C. for several hours. The material is then removed from the bomb and centrifuged to recover the catalyst. Methyl alcohol, formed by splitting off of methoxyl groups by hydrogen, and the solvent are then removed. All of the methoxyl groups of the lignin are converted into methyl alcohol and can be recovered in theoretical amounts from the solvent by fractionation. The highest yield obtained by other methods is 15 to 20 percent of theory.

The residue, which is a viscous colorless liquid, can be fractionated into several colorless components: component I, boiling at 65° to 70° C. and 1 mm. pressure, identified as parapropylcyclohexanol; component II, boiling at 105° to 115° C. and 1 mm. pressure, identified as 4-propyl, 1,2-dihydroxylcyclohexane; component III, boiling at 125° to 130° C. and 1 mm. pressure, identified as 3-p-hydroxycyclohexylpropanol-1;

and a component IV, having the empirical formula $C_{18}H_{33}O_3$ and distilling above 150° C. and 1 mm. pressure, and solidifying into a hard, vitreous mass. Components I, II, III, and IV are unknown compounds which have never been prepared or described before.

When the same conditions in respect to solvent, pressure, temperature, and material were followed, except that nickel was used as a catalyst, the products from the hydrogenation were methanol and a viscous liquid differing from that obtained when copper chromium oxide was used because hydrogenation was incomplete. This viscous liquid retains many of the properties of lignin but flows much more readily and is thermo-setting and therefore may be used as a quick-flowing plastic.

The following examples serve to illustrate the conditions for preparing our product:

*Example 1.*—One hundred grams of dry, acid-free purified lignin isolated from wood by the action of methanol (containing hydrochloric acid) was dissolved in dry, constant boiling, 1,4 dioxan and placed in a bomb with 25 grams of copper chromium oxide catalyst. Then hydrogen, under 3000 pounds per square inch pressure was introduced. The bomb was placed in a shaking device and heated at 250° C. for 8 hours. The material was then removed from the bomb and centrifuged to recover the catalyst. The contents were fractionated into methyl alcohol, water-dioxan mixture, p-n-propylcyclohexanol, 4-n-propyl 1,2-dihydroxycyclohexane, 3 p-hydroxycyclohexyl propanol-1, and a product having the composition $C_{18}H_{33}O_3$ boiling above 150° C. at 1 mm. pressure.

*Example 2.*—One hundred grams of dry, acid-free purified lignin isolated from wood by the action of methanol containing an acid was dissolved in dry, constant boiling, 1,4 dioxan and placed in a bomb with 10 grams of Raney nickel catalyst. Then hydrogen, under 2000 pounds per square inch pressure, was introduced. The bomb was placed in a shaking device and heated to 200° C. for 8 hours. The material was then removed from the bomb and centrifuged to recover the catalyst. The contents were fractionated into methyl alcohol, water-dioxan mixture, dioxan (the solvent), and a viscous brown semi-solid which became a hard vitreous solid on heating.

The methanol prepared in this manner is of very high quality and satisfactory for all purposes for which methanol is used.

Component I, parapropylcyclohexanol, is valuable as a solvent for organic gums and resins, nitrocellulose, and oils such as are used in lacquers. It is a solvent for lignin and may be used as a solvent for hydrogenation of lignin. It is also valuable as a wood preservative, being about equal to creosote in toxicity.

Components II and III are viscous liquids which solidify on long standing and are valuable as plasticizers for the making of lignin and phenol formaldehyde plastics.

Component IV is a hard resin with properties that make it valuable for use in lacquers, either alone or in conjunction with nitrocellulose or cellulose acetate. Compounded with other materials or alone it forms moldable plastics. Its strength properties and water resistance make this material valuable as a cement or adhesive for wood, paper, metal, etc.

Having thus described our invention, what we claim for Letters Patent is:

1. A product consisting of a mixture of monohydroxy cyclohexyl n-propans, monohydroxy cyclohexyl n-propanols, polyhydroxy cyclohexyl n-propans and polyhydroxy cyclohexyl n-propanols resulting from the hydrogenation of lignin in the presence of suitable catalysts at a temperature not exceeding 250° C. and operating pressure ranging from 3,500–6,000 pounds.

2. A crystalline product, 3-p-hydroxycyclohexyl-propanol-1, having an empirical formula $C_9H_{18}O_2$ and a boiling point of 125° to 129° C. at 1 mm. pressure.

3. A vitreous product obtained by the hydrogenation of lignin, and having the empirical formula $C_{18}H_{33}O_3$ and a boiling point above 150° C. at 1 mm. pressure.

4. A process of converting lignin into methyl alcohol, which comprises suspending lignin in a liquid medium inert to the action of hydrogen, the while subjecting the lignin to the action of hydrogen in the presence of copper chromium oxide at substantially 250 C. and pressure greater than 2,000 pounds for such time as to assure completion of the hydrogenation reaction, thence removal of the mixture from the container, thence recovery of the catalyst, as by centrifuging, and thence separation of the methyl alcohol from the solvent medium and other reaction products by fractionation.

5. A process of converting lignin into parapropylcyclohexanol, 4-propyl 1,2-dihydroxycyclohexane, 3-parahydroxycyclohexylpropanol-1, and a high-boiling product having the empirical formula $C_{18}H_{33}O_3$, which consists of treating lignin to the action of hydrogen and a suitable catalyst consisting of copper chromium oxide at high temperatures and pressures for such time as to assure completion of the hydrogenation reaction, thence removal of the mixture from the container, thence recovery of the catalyst as by centrifuging, and thence separation of the parapropylcyclohexanol, 4-propyl 1,2-dihydroxycyclohexane, 3-parahydroxycyclohexyl propanol-1, and the high-boiling product boiling above 150° C. at 1 mm. pressure.

6. A process of converting lignin into methanol and a fast-flowing thermosetting plastic material, which comprises suspending lignin in a liquid medium inert to the action of hydrogen, the while subjecting the lignin to the action of hydrogen in the presence of nickel at substantially 250° C. and pressure greater than 2,000 pounds for such a time as to assure completion of the hydrogenation reaction, thence removal of the mixture from the container, thence recovery of the catalyst as by centrifuging, and thence separation of the product from methyl alcohol and the medium by fractional distillation.

7. A fast-flowing thermosetting plastic material resulting from the hydrogenation of lignin with nickel catalyst.

8. A fast flowing transparent thermoplastic material resulting from the hydrogenation of lignin with copper chromium oxide catalyst.

EARL C. SHERRARD.
ELWIN E. HARRIS.